July 19, 1932. H. C. TUTTLE 1,867,993
BREAD SLICING DEVICE
Filed Dec. 18, 1928
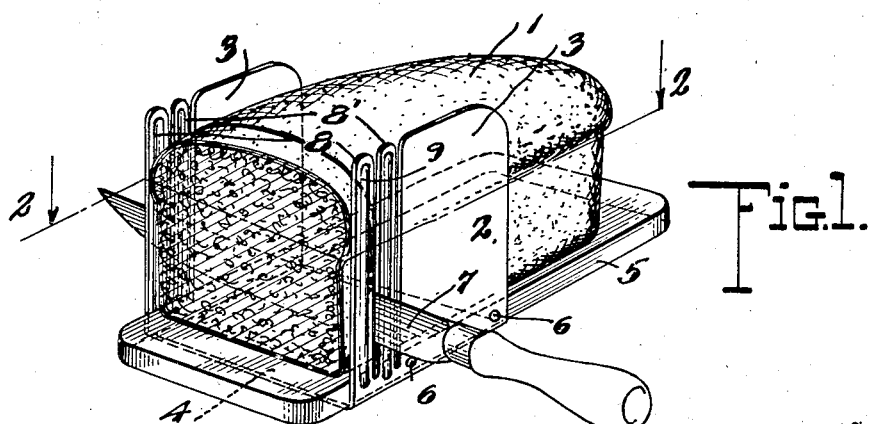
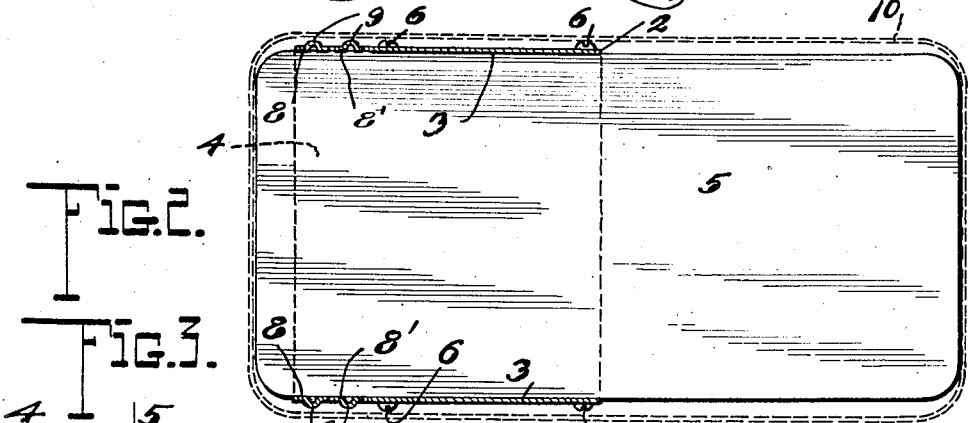
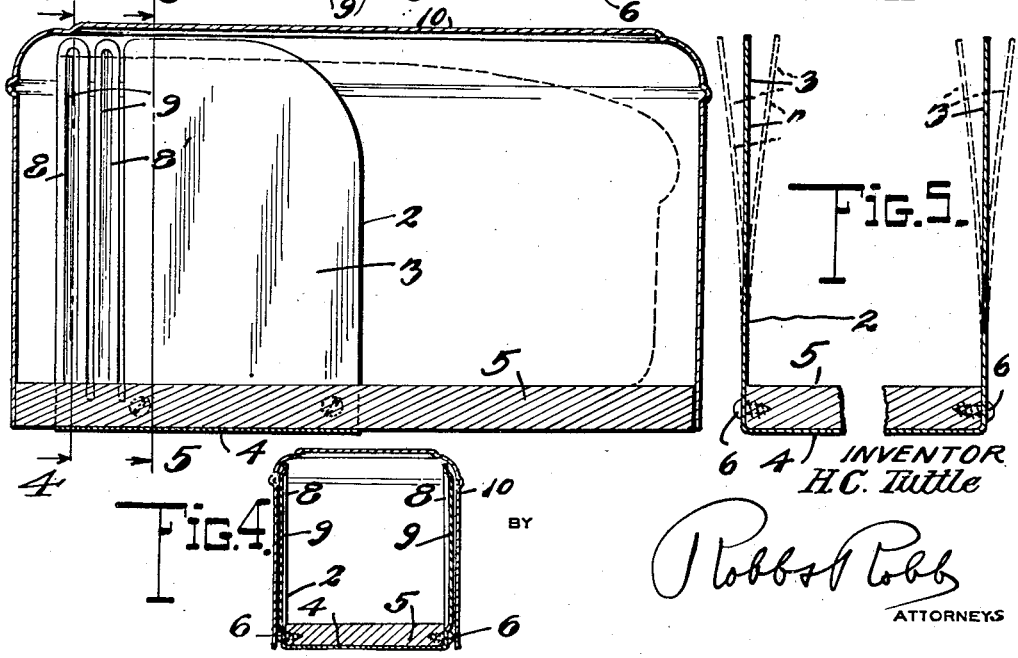
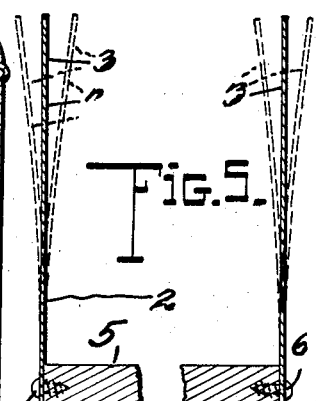
INVENTOR
H. C. Tuttle
BY
Robb & Robb
ATTORNEYS Patented July 19, 1932

1,867,993

UNITED STATES PATENT OFFICE

HARVEY C. TUTTLE, OF ATLANTA, GEORGIA

BREAD SLICING DEVICE

Application filed December 18, 1928. Serial No. 326,821.

This invention pertains to a novel form of slicing device and more particularly to that type of device adapted to slice bread or the like.

Ordinarily it is quite difficult to cut bread into slices of uniform thickness and at the same time maintain each slice uniform in thickness throughout. Especially is this true when the bread being sliced is very fresh or the knife used in cutting the bread is dull. Then, too, if the person cutting the bread is in a hurry for some reason, the slices are very apt to be too thick, too thin, or of varying thickness in the same slice, thereby creating the impression of carelessness.

It is quite obvious that in making sandwiches, the slices of bread should be relatively thin, because usually two slices are used with a filler between, and taking the sandwich as a whole, the relatively thin slices facilitate the ease and daintiness of consumption of the same by a person eating the sandwich.

For toasting, the slices should be of medium thickness to prevent them from becoming too hard, and for slices of bread for ordinary consumption along with a meal, they should be relatively thicker. In view of these preferable differences in thickness of slices, depending on the purpose for which they are to be used, it is an object of this invention to provide a means for gauging the various thicknesses of the slices for the various uses named.

A further object of my invention is to provide a device to hold the loaf of bread while performing the slicing operation and adaptable to hold different sizes of loaves.

A still further object of my invention is to provide a construction of the device which enables it to be readily cleaned, and inexpensively manufactured.

Another object of the invention is to provide a sanitary form of bread slicing device which protects the bread from flies, roaches and other insects and at the same time keeps the bread fresh between periods of use.

A further object of the invention is to provide a construction of the device whereby the bread is clamped to prevent accidental lateral shifting of the same during the slicing operation.

Other and further objects and advantages of the invention will be hereinafter set forth and the novel features thereof defined by the appended claims.

In the drawing:

Fig. 1 is a perspective view of my invention showing a slice of bread in the act of being cut;

Fig. 2 is a sectional view of the device taken on line 2—2 of Fig. 1;

Fig. 3 is a vertical longitudinal sectional view;

Fig. 4 is a sectional view taken on line 4—4 of Fig. 3; and

Fig. 5 is a fragmentary, sectional view taken on line 5—5 of Fig. 3, with the cover removed.

Like numerals refer to like parts in the several figures of the drawing in which 1 denotes a loaf of bread positioned in the clamping or holding member 2 preferably formed of flexible sheet material, said clamping member comprising opposite vertical walls 3 formed integrally with a transverse base portion 4. A base board or member 5 preferably of hard wood is placed in the channel formed by the side walls and the transverse base portion of the clamping member, and is fastened to the clamping member in any suitable manner, such as, for example, by means of screws 6. This base member projects slightly beyond the forward or cutting end of the clamping member and serves to prevent cutting or marring of the table or other rest on which the device is supported when the bread is being cut, and also protects the edge of the bread knife 7 from being dulled by contacting with a metal kitchen table top or the like on which the device rests.

The formation of the clamping member with the integral transverse base portion 4 under the base board 5 provides a very simple construction and at the same time allows a considerably fewer number of screws 6, or securing means, to give the same amount of rigidity to the clamping walls than would be necessary if they were not formed integral with the base portion 4 but merely fastened to the sides of the base board. The use of only a few screws makes it a very simple and quick operation to remove the base board periodically to thoroughly clean all the portions of the device.

The opposite walls 3 of the clamping member are formed at their forward ends with spaced fingers or gauge members 8 and 8' between which the knife 7 is inserted to slice the bread. The forward finger 8 is slightly wider than 8' and this affords the possibility of cutting three different thicknesses of slices. These fingers are provided with pressed out depressions 9 for reinforcing purposes, thereby preventing too much flexibility of the fingers by giving them sufficient rigidity to cause them to spring back to a vertical position in the event a large loaf of bread has deformed them outwardly and is subsequently removed.

I do not wish to be limited to the relative position of the narrow finger 8' with respect to the wide finger 8 as it is quite obvious that the same function of cutting various thicknesses of slices for different purposes may be just as readily performed if the narrow finger 8' were formed at the end of the clamping member and the wide finger formed next, this being just the opposite from the form of construction illustrated in the drawing.

A cover 10 is preferably used in conjunction with my slicing device and may be hinged thereto or not as desired, the said cover serving to keep the bread fresh during intervals when it is not being cut. This cover also affords protection from flies and other insects.

In the use of my invention the loaf of bread to be sliced is placed between the clamping walls so that the end of the loaf is even with the forward edge of finger 8. By inserting the bread knife between fingers 8 and 8', a slice of medium thickness may be cut, but if a thicker slice is desired, the cut is made between fingers 8' and clamping walls 3. To cut a thin slice, the end of the loaf should be even with the slot between fingers 8 and 8' and the cut made between 8' and 3. As the bread is being cut, one hand should span across the top of the clamping walls 3 and press them firmly against the loaf to prevent it from moving and causing an irregular cut, which would be very uneconomical. The other hand is left free to perform the cutting operation with the knife.

The formation of the fingers integral with the clamping walls causes a clamping action to be exerted by the fingers on the slice being cut, this clamping action being caused by a transmission of part of the clamping action to the fingers, said clamping action being exerted by the walls 3 when they are pressed against the loaf of bread. If the bread being cut were very fresh, the slice would curl over as the knife cut deeper and possibly cause a portion of the slice to break off if the fingers did not exert this clamping action. As each slice is cut, the clamping walls are released and the bread is moved forward on the base board into position for the next cut, in which position it is clamped again, the ease with which the bread may be moved forward being greatly facilitated by the construction of the clamping member of considerably less longitudinal length than the length of the loaf.

Having thus described my invention, what I claim as new and desire to secure by Letters Patent is:

1. In a bread slicing device, a holding member composed of sheet material having its ends bent upwardly to form a channel, and a base member disposed in said bread receiving channel and extending the full length of said channel.

2. In a bread slicing device, a clamping member composed of sheet material having vertically opposed yieldable bread clamping walls forming a channel with a transverse base portion, and a base member disposed in said channel.

3. In a bread slicing device, a bread clamping member having vertically opposed flexible bread clamping walls forming a channel, said clamping walls being formed at one end with a bread slice thickness determining gauge finger, and a base member disposed between said clamping walls and adapted to extend beyond said channel.

4. In a bread slicing device, a bread clamping member formed from a single piece of resilient sheet material having opposed vertical bread clamping walls, said clamping walls being sufficiently wide to provide substantial gripping surfaces and being formed at one end thereof with a plurality of slice thickness determining gauge fingers, certain of said fingers being of a different width from the others, and a base board disposed in said bread clamping member.

5. In a bread slicing device, a bread clamping member formed from a single piece of sheet material having relatively long fingers formed on vertical bread clamping walls, said clamping walls being formed at one end thereof with a plurality of slice thickness determining gauge fingers, said fingers having depressions formed in the vertical length thereof to stiffen the same, and a base board disposed in the said clamping member.

6. In a bread slicing device, a sheet metal clamping member comprising a transverse base portion formed with opposed vertical bread clamping walls adapted to yieldably engage a loaf of bread, each of said walls having two gauge fingers of different widths, a base board disposed between the clamping walls and above the transverse base portion of the said clamping member and extending considerably farther in a longitudinal direction beyond one end of said clamping member than the other, said base board being secured to the side walls of the said clamping member, and a sheet metal cover adapted to fit over the base board and clamping member.

In testimony whereof I affix my signature.

HARVEY C. TUTTLE.